United States Patent [19]
Koda et al.

[11] Patent Number: 5,688,535
[45] Date of Patent: Nov. 18, 1997

[54] DRIVE CONTROL APPARATUS FOR AN INJECTION MOLDING MACHINE

[75] Inventors: Toshiyasu Koda; Tsuyoshi Arai, both of Nagano, Japan

[73] Assignee: Nissei Plastic Industries, Ltd., Nagano-ken, Japan

[21] Appl. No.: 562,895

[22] Filed: Nov. 27, 1995

[30] Foreign Application Priority Data

Nov. 28, 1994 [JP] Japan .................................. 6-319089

[51] Int. Cl.⁶ .................................................. B29C 45/77
[52] U.S. Cl. .......................... 425/145; 264/40.7; 425/149
[58] Field of Search ...................... 425/145, 149, 425/150; 264/40.7

[56] References Cited

U.S. PATENT DOCUMENTS

| | | | |
|---|---|---|---|
| 4,411,609 | 10/1983 | Yoshii et al. | 425/149 |
| 4,889,478 | 12/1989 | Sato | 425/149 |
| 5,059,364 | 10/1991 | Okudo et al. | 425/150 |
| 5,186,954 | 2/1993 | Miyahara et al. | 425/149 |
| 5,221,509 | 6/1993 | Fujimoto et al. | 425/150 |
| 5,494,427 | 2/1996 | Arai | 425/145 |
| 5,533,884 | 7/1996 | Nakamura et al. | 425/149 |

FOREIGN PATENT DOCUMENTS 5-50483  3/1993  Japan .

*Primary Examiner*—Tim Heitbrink
*Attorney, Agent, or Firm*—Birch, Stewart, Kolasch & Birch, LLP

[57] ABSTRACT

A drive control apparatus connects a hydraulic source 4 and an oil tank 5 to an injection cylinder 2 through a servo valve 3 and controls the injection cylinder 2 by the servo valve 3. A first change-over valve 6 which is connected between the hydraulic source 4 and the servo valve 3 and has a large capacity. A flow limiting circuit 9 connects a throttle valve 7 to a second change-over valve 8 having a small capacity in series and is connected to the first change-over valve 6 in parallel. A change-over valve control portion 10 opens both the first change-over valve 6 and the second change-over valve 8 when controlling a large rate of flow in an injection process or the like and controls to close the first change-over valve 6 when controlling a small rate of flow in a pressure maintenance process or the like. As a result, the first change-over valve 6 having a large capacity and the second change-over valve 8 (which is connected to the throttle valve 7 in series and has a small capacity) are opened so that the control suitable for the large rate of flow is performed when controlling the large rate of flow. When the first change-over valve 6 having a large capacity is closed, control of a small rate of flow is carried out.

6 Claims, 3 Drawing Sheets

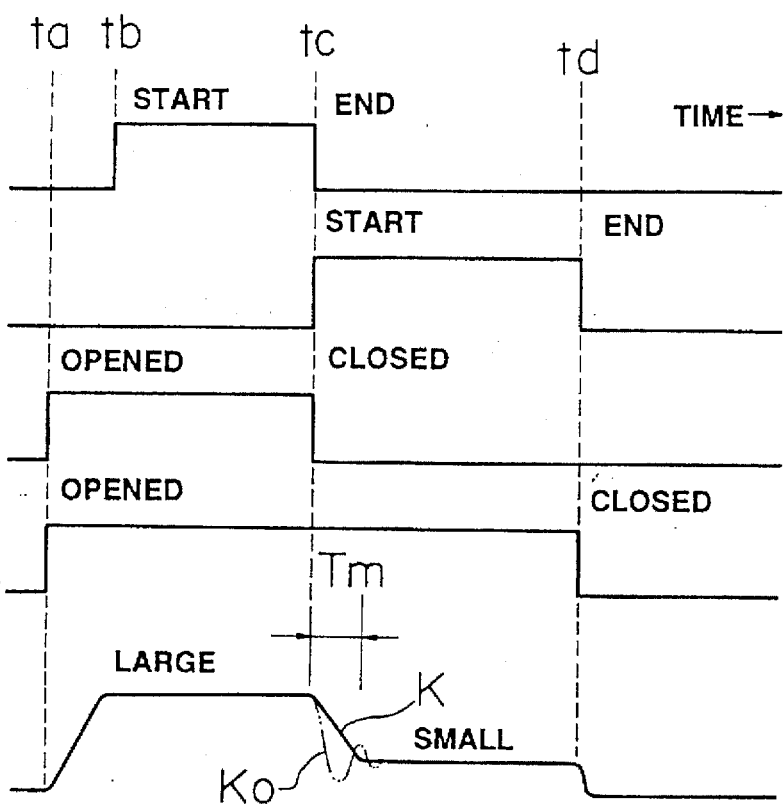
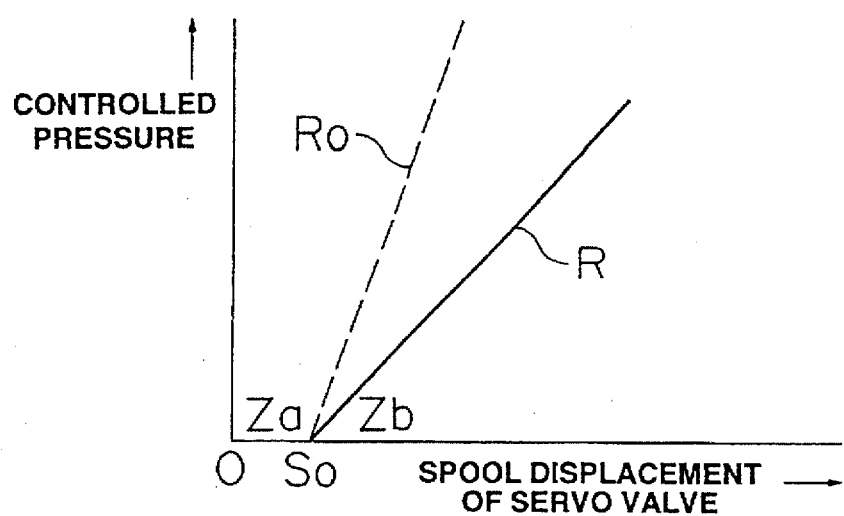

DRIVE CONTROL APPARATUS FOR AN INJECTION MOLDING MACHINE

BACKGROUND OF THE INVENTION

1. Field of the Invention

The present invention relates to a drive control apparatus for an injection molding machine, for controlling an injection cylinder by using a servo valve.

2. Description of the Relevant Art

An injection molding machine provided with a hydraulic drive control apparatus has been conventionally known in Japanese Patent Laid-open publication No. 5(1993)-50483. This type of the drive control apparatus will now be explained with reference to FIG. 5. Note that the drive control apparatus illustrated in FIG. 5 is a type that has a change-over valve connected between a hydraulic pump and a servo valve in the drive control apparatus. In FIG. 5, reference numeral 60 denotes an injection apparatus which constitutes the injection molding machine and is provided with an injection apparatus body 61 and a drive control apparatus 71 for controlling the injection apparatus body 61.

The injection apparatus body 61 has a heating cylinder 64 having an injection nozzle 62 at a front end thereof and a hopper 63 at a rear portion thereof. The heating cylinder 64 includes a screw 65 therein. Further, a rear end of the heating cylinder 64 is connected to a screw drive portion 66. The screw drive portion 66 is provided with an injection cylinder 67 including a piston 68p of a double-rod type therein and an oil motor 69 in which a rotating shaft is spline-connected to a rear end of a piston rod 68r, and the piston rod 68r protruding from the front end of the injection cylinder 67 is connected to a rear end of the screw 65.

Meanwhile, the drive control apparatus 71 is provided with a hydraulic circuit 72 for driving the injection cylinder 67 and the oil motor 69 and a control circuit 73 for controlling the hydraulic circuit 72. The hydraulic circuit 72 is made up of: a hydraulic source 75 having a hydraulic pump 74p and a pressure accumulator 74a; an oil tank 76; a change-over valve 77; a servo valve 78; and a check valve 79. The hydraulic source 75 and the oil tank 76 are thus selectively connected to a front oil chamber and a rear oil chamber of the injection cylinder 67 through the change-over valve 77 and the servo valve 78. Incidentally, the illustration of the hydraulic circuit on the oil-motor-69 side is omitted. Further, the control circuit 73 is provided with a position sensor 80 for detecting a position of the screw 65 and pressure sensors 81 and 82 for detecting hydraulic pressures in the front and rear oil chambers of the injection cylinder 67. The respective sensors 80, 81 and 82 are connected to a controller 83.

Therefore, the change-over valve 77 can be opened during the molding operation; an injection speed can be controlled by the servo valve 78 in the injection process; and pressure is controlled by the servo valve 78 in the pressure maintenance process.

The above-mentioned drive control apparatus 71, however, has following drawbacks:

Capacities of the change-over valve 77 and the servo valve 78 used for controlling the injection cylinder 67 must be selected to have such a value as that it is possible to secure a maximum injection speed in the injection process (a speed control area) in which at least a rate of flow becomes maximum. On the other hand, the screw 65 rarely shows its movement in the pressure maintenance process (a pressure control area), and the rate of flow hence approximates zero.

Therefore, in the injection molding machine, it is necessary to use the change-over valve 77 and the servo value 78 for a large rate of flow, both of which have such a capacity as that the maximum rate of flow can be sufficiently secured, and the change-over valve 77 and the servo valve 78 for a large rate of flow must be also used in the pressure control during which the rate of flow becomes closer to zero.

On the other hand, if the servo valve having a large capacity is used, the characteristic of the controlled pressure with respect to a spool displacement of the servo valve is as shown by a reference character Ro in FIG. 4, and a pressure gain becomes relatively large as compared with that obtained from the servo valve having a small capacity.

Thus, in the case where the conventional servo valve 78 having a large capacity is used, the spool of the servo valve 78 shows displacement in the vicinity of zero and enters the overlapped state for suppressing a quantity of internal leakage of the servo valve 78 in the pressure maintenance process. In other words, in the pressure control of a closed-loop system, the control for increasing and/or decreasing a rate of flow is usually carried out so that a pressure detection value becomes a target value for pressure detection. However, if the pressure control is carried out in an area where the screw 65 rarely shows movement, the spool of the servo valve 78 having a large capacity repeatedly moves between a dead zone Za on the left side of a zero point So and a pressure gain Zb on the right side of the same in FIG. 4. As a result, when the servo valve 78 having a large pressure gain is used, a fluctuation of the pressure in the vicinity of the zero point So becomes relatively large so that the pressure control becomes extremely unstable in the pressure maintenance process, and in particular, there is a problem such that the prior art can not be used for moldings requiring a high mold quality.

SUMMARY OF THE INVENTION

It is therefore an object of the present invention is to provide a drive control apparatus for an injection molding machine capable of obtaining a high mold quality by stabilizing both the speed control with a large rate of flow and the pressure control with a small rate of flow.

Further, it is another object of the present invention is to provide a drive control apparatus for an injection molding machine which can be realized by additionally providing a throttle valve and a second change-over valve having a small capacity and which can be manufactured at a low cost.

Moreover, it is still another object of the present invention is to provide a drive control apparatus for an injection molding machine which can prevent a fluctuation in a rate of flow caused due to a shock by gradually closing a first change-over valve when switching from a control for a large rate of flow to a control for a small rate of flow so that it is possible to stably change over from the large rate of flow to the small rate of flow.

To this end, in a drive control apparatus in which an injection cylinder 2 is connected to a hydraulic source 4 and an oil tank 5 through a Servo valve 3 to control the injection cylinder 2 by the servo valve 3, the present invention comprises: a first change-over valve 6, connected between the hydraulic source 4 and the servo valve 3, having a large capacity; a flow limiting circuit 9 which connects a throttle valve 7 with a second change-over valve 8 having a capacity smaller than that of the first change-over valve 6 in series and is connected with the first change-over valve 6 in parallel; and a change-over valve control circuit 10 which controls to open both the first change-over valve 6 and the second change-over valve 8 when controlling a large rate of flow in an injection process or the like and controls to close the first change-over valve 6 when controlling a small rate of flow in a pressure maintenance process or the like.

In such a case, a four-port servo valve is used as the servo valve 3, and an A port and a B port in this four-port servo valve 3 are connected to a front oil chamber and a rear oil chamber of the injection cylinder 2, respectively. Also, a T port of the servo valve 3 is connected to the oil tank 5, and a P port of the same is connected to the first change-over valve 6 and the second change-over valve 8 or the throttle valve 7. Further, there is provided a change-over valve operation limiting circuit 11 for gradually closing the first change-over valve 6 at the time of switching from a control for a large rate of flow to a control for a small rate of flow, and the change-over valve operation limiting circuit 11 connects a pilot circuit portion of the first change-over valve 6 to the oil tank 5 through a throttle valve 27 when switching from the control for a large rate of flow to the control for a small rate of flow.

Thus, in case of controlling a large rate of flow in an injection process or the like for controlling the speed, the first change-over valve 6 having a larger capacity and the second change-over valve 8 which is connected to the throttle valve 7 in series and has a smaller capacity are opened by the control of the change-over valve controlling portion 10. As a result, a rate of flow, which is a combination of rates of flow flowing through both the first change-over valve 6 and the second change-over valve 8, is supplied to the servo valve 3, and control of a large rate of flow is carried out.

On the other hand, in case of controlling a small rate of flow in a pressure maintenance process or the like for controlling a pressure, the first change-over valve 6 having a larger capacity is closed by the control of the change-over valve control portion 10. Consequently, the servo valve 3 is supplied only with a rate of flow flowing through the second change-over valve 8, i.e., a small rate of flow obtained by throttling the throttle valve 7, and control of a small rate of flow is carried out. In this case, since the rate of flow supplied to the servo valve 3 is reduced, the pressure gain becomes small as a characteristic of the controlled pressure with respect to a spool displacement of the servo valve 3. Therefore, even if the spool of the servo valve 3 shows a displacement in the vicinity of zero in order to suppress the quantity of internal leakage of the servo valve 3 when the rate of flow is small, a fluctuation in the pressure is suppressed, enabling the stable pressure control when controlling the small rate of flow.

Incidentally, since the first change-over valve 6 is gradually closed by the change-over valve operation limiting circuit 11 when closing at least the first change-over valve 6, a fluctuation in the rate of flow caused due to a shock is eliminated, permitting a stable shift from the large rate of flow to the small rate of flow.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a block diagram showing a controller provided in the injection molding machine;

FIGS. 3(A) to (E) are timing charts showing operation timings of respective portions in the drive control apparatus according to the present invention;

FIG. 4 is a characteristic view showing a controlled pressure with respect to a spool displacement of a servo valve.

DETAILED DESCRIPTION OF THE PREFERRED EMBODIMENT

A preferred embodiment according to the present invention will now be described in detail with reference to the accompanying drawings.

A configuration of a drive control apparatus according to the present invention will first be explained in connection with FIGS. 1 and 2.

Figure 1:
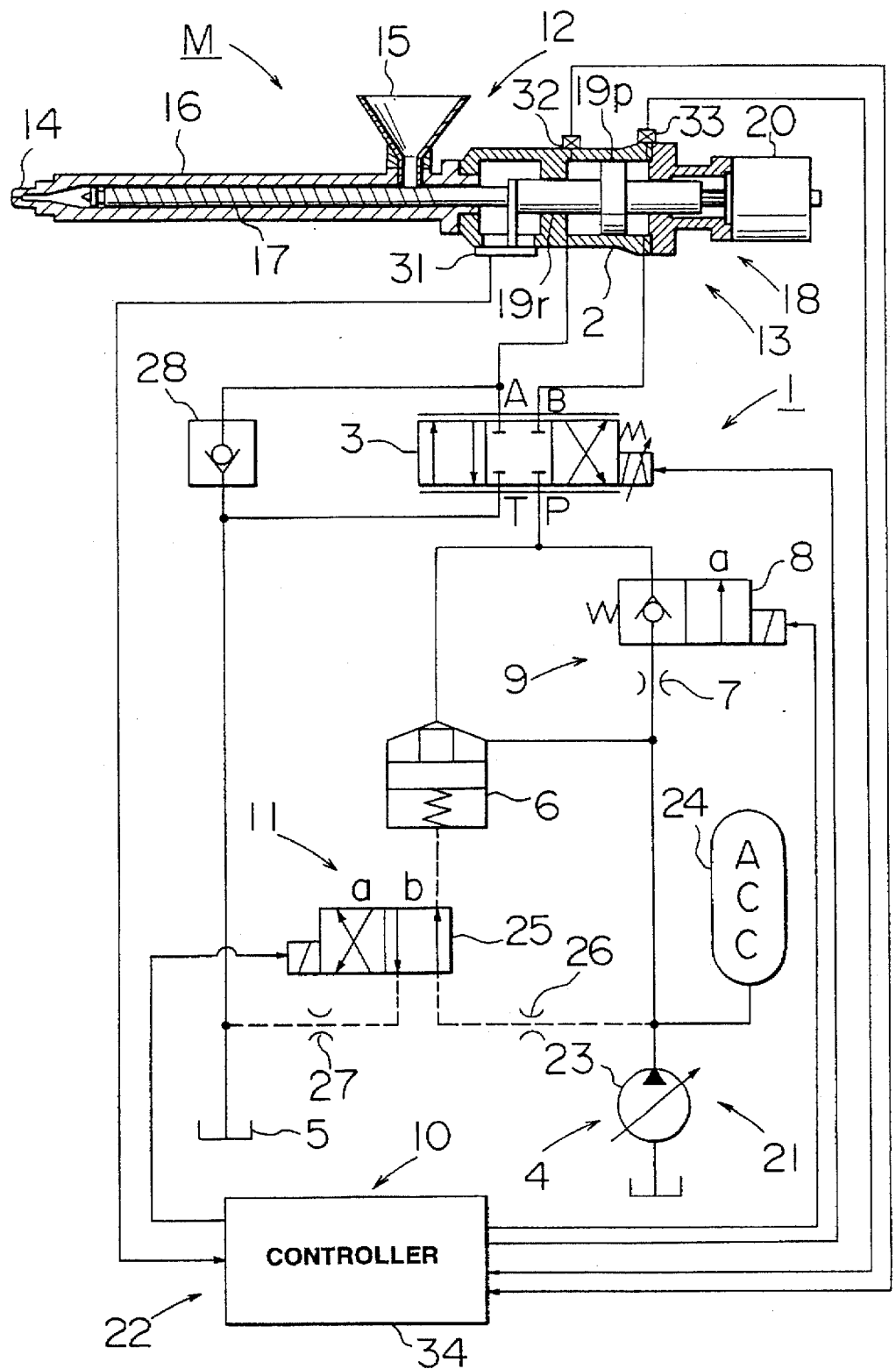
FIG. 1 is a block diagram showing an injection molding machine including a drive control apparatus according to the present invention.
Figure 5:
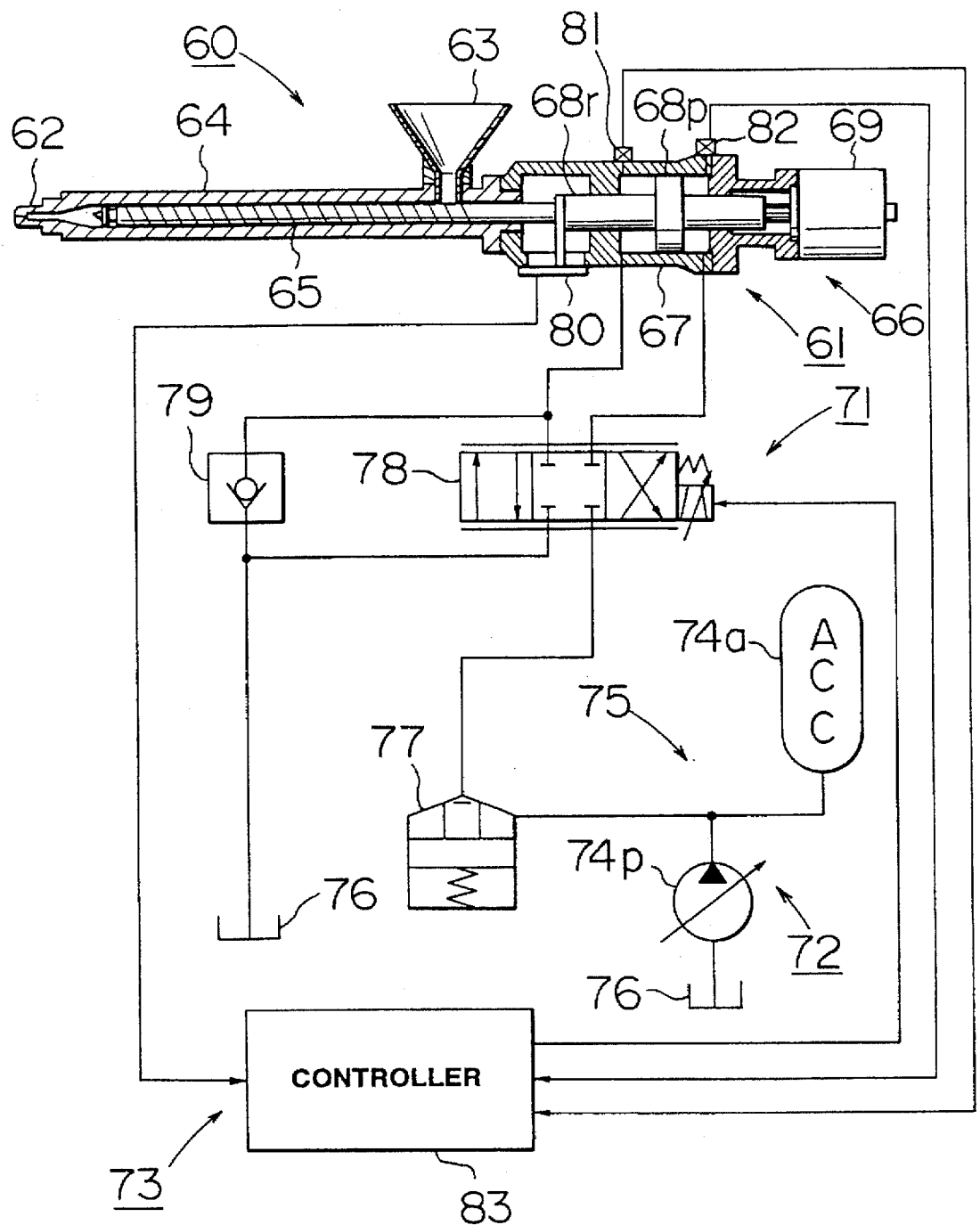
FIG. 5 is a block diagram showing an injection molding machine including a drive control apparatus according to the prior art.

FIG. 1 shows an injection molding machine M provided with a drive control apparatus 1 according to the present invention. In the drawing, a reference numeral 12 denotes an injection apparatus constituting the injection molding machine M, the injection apparatus 12 being provided with an injection apparatus body 13 and the drive control apparatus 1 for controlling to drive the injection apparatus body 13.

The injection apparatus body 13 has a heating cylinder 16 having an injection nozzle 14 at a front end thereof a hopper 15 at a rear portion thereof, the heating cylinder 16 having a screw 17 therein. Further, a rear end of the heating cylinder 16 is connected to a screw drive portion 18. The screw drive portion 18 is provided with an injection cylinder 2 having a piston 19p of a double-rod type, and an oil motor 20 constituted by spline-connecting a rotating shaft to a rear end of a piston rod 19r, the piston rod 19r which protrudes from a front end of the injection cylinder 2 being connected to a rear end of the screw 17.

Meanwhile, the drive control apparatus 1 is provided with an hydraulic circuit 21 for driving the injection cylinder 2 and the oil motor 20, and a control circuit 22 for controlling the hydraulic circuit 21. The hydraulic circuit 21 includes a hydraulic source 4 having a hydraulic pump 23 and a pressure accumulator 24, and an oil tank 5. In addition, a reference numeral 3 denotes a four-port servo valve, an A port and B port thereof being connected to a front oil chamber and a rear oil chamber of the injection cylinder 2, respectively, and a T port of the same being connected to the oil tank 5. Further, a P port of the servo valve 3 is connected to the hydraulic source 4 through a first change-over valve 6 which is capable of controlling a large rate of flow and has a large capacity. Moreover, a flow limiting circuit 9 is constituted by connecting a throttle valve 7 to a second change-over valve 8 having a small capacity in series, the flow limiting circuit 9 being connected to the first change-over valve 6 in parallel. On the other hand, a pilot circuit portion of the first change-over valve 6 is so configured as to be able to be connected to the hydraulic source 4 or the oil tank 5 through a third change-over valve 25, and a throttle valve 26 is connected between the third change-over valve 25 and the hydraulic source 4. Further, a throttle valve 27 is connected between the third change-over valve 25 and the oil tank 5. In this case, the third change-over valve 25 and the throttle valves 26 and 27 constitute a change-over valve operation limiting circuit 11. In the drawing, a reference numeral 28 designates a check valve connected between the A port and the T portion of the servo valve 3. Note that an illustration of a hydraulic circuit on the oil-motor-20 side is omitted.

Further, the control circuit 22 is provided with a position sensor 31 for detecting a position of the screw 17, and pressure sensors 32 and 33 for detecting hydraulic pressures in the front and rear oil chambers of the injection cylinder 2, the respective sensors 31, 32 and 33 being connected to an input side of a controller 34. On the other hand, an output side of the controller 34 is connected to control signal input portions of the servo valve 3, the second change-over valve 8 and the third change-over valve 25. Therefore, the controller 34 constitutes the change-over valve control portion 10.

Note that the controller 34 is illustrated in FIG. 2 in detail. In the drawing, a position detection value obtained from the position sensor 31 is differentiated with time in a speed converting portion 35 to be converted into a speed detection value. Further, a differential pressure is calculated by a differential detecting portion 36 from pressure detection signals obtained from the pressure sensors 32 and 33, and the thus-obtained differential pressure hence becomes a pressure detection value.

Meanwhile, reference numeral 37 denotes a feedback control circuit for a speed, including a speed setting portion 38, a deviation calculating portion 39 and a speed compensating portion 40. In the feedback control circuit 37, a speed detection value obtained from the speed converting portion 35 and a speed command value obtained from the speed setting portion 38 are supplied to the deviation calculating portion 39 to calculate a deviation between the speed detection value and the speed command value in the injection process for controlling the speed. This deviation is supplied to the speed compensating portion 40 and, upon being speed-compensated, it is further fed to the servo valve 3 through a loop change-over portion 41 and a servo valve control circuit 42. The feedback control is then carried out so that the speed detection value (injection speed) coincides with the speed command value.

Moreover, reference numeral 43 represents a feedback control circuit for a position, including a position setting portion 44, a deviation calculating portion 45 and a position compensating portion 46. In the feedback control circuit 43, a position detection value obtained from the position sensor 31 and a position command value obtained from the position setting portion 44 are supplied to the deviation calculating portion 45 where a deviation between the position detection value and the position command value is calculated. This deviation is supplied to the position compensating portion 46 and, upon being position-compensated, it is further fed to the servo valve 3 through the loop change-over portion 41 and the servo control circuit 42. The feedback control is then performed so that the position detection value (a position of the screw) coincides with the position command value.

In addition, a reference numeral 48 denotes a feedback control circuit for a pressure, including a pressure setting portion 49, a deviation calculating portion 50 and a pressure compensating portion 51. In the feedback control circuit 48, a pressure detection value obtained from the differential detecting portion 36 and a pressure command value obtained from a pressure setting portion 49 are supplied to the deviation calculating portion 50 where a deviation between the pressure detection value and the pressure command value is calculated. This deviation is given to the pressure compensating portion 51 and, upon being pressure-compensated, it is further fed to the servo value 3 via the loop change-over portion 41 and the servo control circuit 42. The feedback control is then carried out so that the pressure detection value (maintained pressure) coincides with the pressure command value.

Next, the operation of the drive control apparatus 1 according to the present invention will now be described with reference to FIGS. 1 to 4.

In the first place, a control for a large rate of flow is performed in the injection process including a speed control for an injection speed. Therefore, both the first change-over valve 6 having a large capacity and the second change-over valve 8 (which is connected to the throttle valve 7 in series and has a small capacity) are first opened by the control of the controller 34. In this case, the second change-over valve 8 and the third change-over valve 25 are changed over in the direction represented by a symbol a. Accompanying therewith, since the pilot circuit portion of the first change-over valve 6 is connected to the oil tank 5 through the throttle valve 7, the pilot pressure of the first change-over valve 6 is gradually lowered and the first change-over valve 6 gradually opens. FIGS. 3(C) and (D) show opened and closed states of the third change-over valve 25 and the second change-over valve 8, wherein the third change-over valve 25 and the second change-over valve 8 are opened at a time point ta. Further, FIG. 3(E) shows a rate of flow, wherein the rate of flow gradually increases from the time point ta by gradually opening the first change-over valve 6. As apparent from these drawings, to the servo valve 8 is supplied a rate of flow which is a combination of rates of flow flushing through both the first change-over valve 6 and the second change-over valve 8, thereby enabling the control suitable for the large rate of flow.

Then, the injection process is effected if the rate of flow is stabilized. FIG. 3(A) shows such a state as that the injection process is started at a time point tb and completed at a time point tc.

Further, the pressure maintenance process is then started upon completion of the injection process. FIG. 3(B) shows such a state as that the pressure maintenance process is started at the time point tc and completed at a time point td. In the pressure maintenance process including the pressure control with respect to the maintained pressure, a control for a small rate of flow is carried out. The first change-over valve 6 having a large capacity is therefore closed by the control of the controller 34. In this case, as shown in FIG. 3(C), the third change-over valve 25 is changed over in the direction represented by a symbol b at a time point tc, and the pilot circuit portion of the first change-over valve 6 is connected to the hydraulic source 4 via the throttle valve 26. As a result, the first change-over valve 6 is gradually closed and, as shown by a reference character K in FIG. 3(E), the rate of flow supplied to the servo valve 3 is gradually reduced during the time Tm.

Thus, the large rate of flow is stably shifted to the small rate of flow, and it is possible to prevent a fluctuation in the rate of flow due to such a shock as shown by a virtual line Ko which can be caused when only the first change-over valve 6 is used.

Consequently, the servo valve 3 is supplied with only the rate of flow flushing through the second change-over valve 8, i.e., a small rate of flow obtained by throttling the throttle valve 7, whereby control of the small rate of flow is enabled. In such a case, since the rate of flow fed to the servo valve 3 is reduced, the characteristic of the controlled pressure with respect to the spool displacement of the servo valve 3 is as shown by a reference character R in FIG. 4, and the pressure gain becomes small as compared with that of the characteristic Ro of the prior art in which only the first change-over valve 6 is used. As a result, even if the spool of the servo valve 3 shows displacement in the vicinity of zero (a point So), a fluctuation in the pressure is relatively suppressed, enabling the stable pressure control when controlling the small rate of flow.

As mentioned above, the description has been given as to the embodiment, but the present invention is not restricted to the above embodiment, and the configuration of details and the technique thereof may be arbitrarily changed within the true scope of the present invention.

What is claimed is:

1. A drive control apparatus for an injection molding machine in which a hydraulic source and an oil tank are connected to an injection cylinder through a servo valve and the injection cylinder is controlled by the servo valve, the drive control apparatus for an injection molding machine comprising:

a first change-over valve which is connected between the hydraulic source and the servo valve and has a first capacity of hydraulic fluid; a flow limiting circuit which connects a throttle valve to a second change-over valve having a second capacity of hydraulic fluid smaller than that of the first change-over valve in series and is connected to the first change-over valve in parallel; and a change-over valve control portion which controls to open both the first change-over valve and the second change-over valve when controlling a first rate of flow of hydraulic fluid and which controls to close the first change-over valve when controlling a second rate of flow of hydraulic fluid, said second rate being smaller than said first rate.

2. The drive control apparatus for an injection molding machine according to claim 1, wherein a four-port servo valve is used as the servo valve; a first port and a second port in the four-port servo valve are connected to a front oil chamber and a rear oil chamber of the injection cylinder, respectively; a third port of the servo valve is connected to the oil tank; and fourth port of the servo valve is connected to at least one of the first change-over valve, the second change-over valve and the throttle valve.

3. The drive control apparatus for an injection molding machine according to claim 1, wherein an injection molding process is effected when controlling said first rate of flow of said hydraulic fluid.

4. The drive control apparatus for an injection molding machine according to claim 1, wherein a pressure maintenance process is effected when controlling said second rate of flow of said hydraulic fluid.

5. The drive control apparatus for an injection molding machine according to claim 1, further comprising a change-over valve operation limiting circuit for gradually closing the first change-over valve when changing over from the control for said first rate of flow to the control for said second rate of flow of said hydraulic fluid.

6. The drive control apparatus for an injection molding machine according to claim 5, wherein the change-over valve operation limiting circuit connects a pilot circuit portion of the first change-over valve to the oil tank via the throttle valve when changing over from the control for said first rate of flow to the control for said second rate of flow of said hydraulic fluid.

* * * * *